US011577916B2

(12) United States Patent
Condon et al.

(10) Patent No.: US 11,577,916 B2
(45) Date of Patent: Feb. 14, 2023

(54) APPARATUS AND METHOD FOR TRANSFERRING CONTAINERS

(71) Applicant: Pretium Packaging, L.L.C., Chesterfield, MO (US)

(72) Inventors: Guy A. Condon, Palatine, IL (US); Carl Jay Cloward, Fruit Heights, UT (US)

(73) Assignee: Pretium Packaging, L.L.C., Chesterfield, MO (US)

( * ) Notice: Subject to any disclaimer, the term of this patent is extended or adjusted under 35 U.S.C. 154(b) by 332 days.

(21) Appl. No.: 16/948,226

(22) Filed: Sep. 9, 2020

(65) Prior Publication Data

US 2020/0399076 A1 Dec. 24, 2020

Related U.S. Application Data

(63) Continuation of application No. 16/158,643, filed on Oct. 12, 2018, now Pat. No. 10,800,612.

(51) Int. Cl.
*G06F 7/00* (2006.01)
*B65G 47/52* (2006.01)
*B25J 5/00* (2006.01)
*B25J 15/06* (2006.01)
*B65G 61/00* (2006.01)
*B25J 9/00* (2006.01)

(52) U.S. Cl.
CPC .............. *B65G 47/52* (2013.01); *B25J 5/007* (2013.01); *B25J 9/0093* (2013.01); *B25J 15/0616* (2013.01); *B65G 61/00* (2013.01); *B65G 2201/0235* (2013.01)

(58) Field of Classification Search
CPC .................... B65G 47/52; B65G 61/00; B65G 2201/0235; B25J 5/007; B25J 9/0093; B25J 15/0616; B25J 5/02
USPC .......................................... 700/213–214, 228
See application file for complete search history.

(56) References Cited

U.S. PATENT DOCUMENTS

| | | | |
|---|---|---|---|
| 5,060,455 A | 10/1991 | Schmeisser | |
| 7,823,273 B2 | 11/2010 | Braun | |
| 8,182,191 B2 * | 5/2012 | Cartal | B07C 1/025 414/407 |
| 8,622,685 B2 | 1/2014 | Van Schijndel et al. | |
| 8,725,285 B2 | 5/2014 | Irie et al. | |
| 9,393,686 B1 * | 7/2016 | Bradski | B25J 9/162 |
| 9,802,312 B2 | 10/2017 | Natsume et al. | |
| 9,966,286 B2 | 5/2018 | Nogami et al. | |

(Continued)

FOREIGN PATENT DOCUMENTS

EP 1260469 A1 11/2002
WO 2005105577 A1 11/2005

(Continued)

*Primary Examiner* — Yolanda R Cumbess
(74) *Attorney, Agent, or Firm* — Armstrong Teasdale LLP

(57) ABSTRACT

An apparatus for transferring a container from a first station to a second station of a container forming line includes a frame, a slide mounted to the frame, and a robotic arm mounted to the slide and movable along the slide between the first station and the second station. The robotic arm includes an end effector operable to remove the container from the first station. The frame is removably coupleable to at least one of the first station and the second station such that the apparatus is transportable to a different container forming line.

20 Claims, 11 Drawing Sheets

(56) References Cited

U.S. PATENT DOCUMENTS

| | | |
|---|---|---|
| 2006/0072988 A1 | 4/2006 | Hariki et al. |
| 2006/0090424 A1 | 5/2006 | Tokarz et al. |
| 2008/0221728 A1* | 9/2008 | Inui .................. H01L 21/67775 |
| | | 700/230 |
| 2011/0301757 A1 | 12/2011 | Jones et al. |
| 2015/0063973 A1* | 3/2015 | Girtman ................ B65G 67/08 |
| | | 901/1 |
| 2018/0057263 A1 | 3/2018 | Beer |
| 2018/0082757 A1 | 3/2018 | Chambers et al. |
| 2018/0178436 A1 | 6/2018 | Byun |
| 2018/0251303 A1 | 9/2018 | Mathi et al. |

FOREIGN PATENT DOCUMENTS

| | | |
|---|---|---|
| WO | 2007004551 A1 | 1/2007 |
| WO | 2012055410 A2 | 5/2012 |
| WO | 2017076130 A1 | 5/2017 |

* cited by examiner

APPARATUS AND METHOD FOR TRANSFERRING CONTAINERS

CROSS-REFERENCE TO RELATED APPLICATIONS

This application is a continuation application of U.S. patent application Ser. No. 16/158,643, filed Oct. 12, 2018, the disclosure of which is hereby incorporated by reference in its entirety.

BACKGROUND

This disclosure is directed to a system for forming containers, and more specifically to a container transfer apparatus for transferring containers between stations of a container forming system.

In container forming systems, containers are typically transferred between different stations of the container forming system for carrying out various operations of the container forming process. In some known container forming systems, for example, containers are first partially formed in a molding process at a first, molding location, and are subsequently transported to a second station to have excess material (e.g., flashing) removed from the container, such as a deflashing location. Conventional container forming systems use dedicated transfer apparatuses for moving containers between different locations of the container forming system. Such dedicated transfer apparatuses are not compatible with or readily adaptable for use with more than one container forming line. Consequently, known container forming systems require dedicated container transfer apparatuses for each container forming line of the container forming system, adding cost and complexity to the container forming system. Additionally, at least some known container transfer apparatuses are not fully automated and/or may require manual intervention, which can delay processing of containers and reduce overall throughput of the container forming system. Accordingly, there is a need for improved automated transfer apparatuses for transferring containers between locations in a container forming system.

BRIEF DESCRIPTION OF THE DISCLOSURE

In one aspect, an apparatus for transferring a container from a first station to a second station of a container forming line is provided. The apparatus includes a frame, a slide mounted to the frame, and a robotic arm mounted to the slide and movable along the slide between the first station and the second station. The robotic arm includes an end effector operable to remove the container from the first station. The frame is removably coupleable to at least one of the first station and the second station such that the apparatus is transportable to a different container forming line.

In another aspect, a system for forming a container is provided. The system includes a first station, a second station, and a transfer apparatus for transferring the container from the first station to the second station. The transfer apparatus includes a frame removably coupled to at least one of the first station and the second station, a slide mounted to the frame, and a robotic arm mounted to the slide and movable along the slide between the first station and the second station. The robotic arm includes an end effector operable to remove the container from the first station.

In a further aspect, a method of assembling a container forming line including a first station and a second station is provided. The method includes providing a transfer apparatus including a slide mounted to a frame, and a robotic arm mounted to the slide and movable along the slide. The robotic arm includes an end effector operable to remove the container from the first station. The method also includes removably coupling the frame to at least one of the first station and the second station such that the robotic arm is movable along the slide between the first station and the second station, and programming a controller communicatively coupled to the robotic arm to move the end effector along a path of motion. Programming the controller includes inputting, using a user interface, a sequence of positions for the end effector. The controller determines the path of motion based on the user-input sequence of positions and generates computer-executable instructions which, when executed by the controller, cause the robotic arm to move the end effector along the determined path of motion

DETAILED DESCRIPTION OF THE DISCLOSURE

A container forming system is described herein that facilitates transferring containers from one station to another. In some embodiments, the system enables removing one or more containers from a first, molding station and transferring the one or more containers to a second, deflashing station. The container forming system includes a container transfer apparatus that is reconfigurable to work with different container forming lines. In some embodiments, the container transfer apparatus includes a wheeled frame and a robotic arm coupled to the frame. The wheeled frame enables transporting the container transfer apparatus between different locations within the system. The robotic arm is configured to grip containers to transfer containers between stations at any location within the system, and is reprogrammable to facilitate use on different container forming lines.

Figure 1:
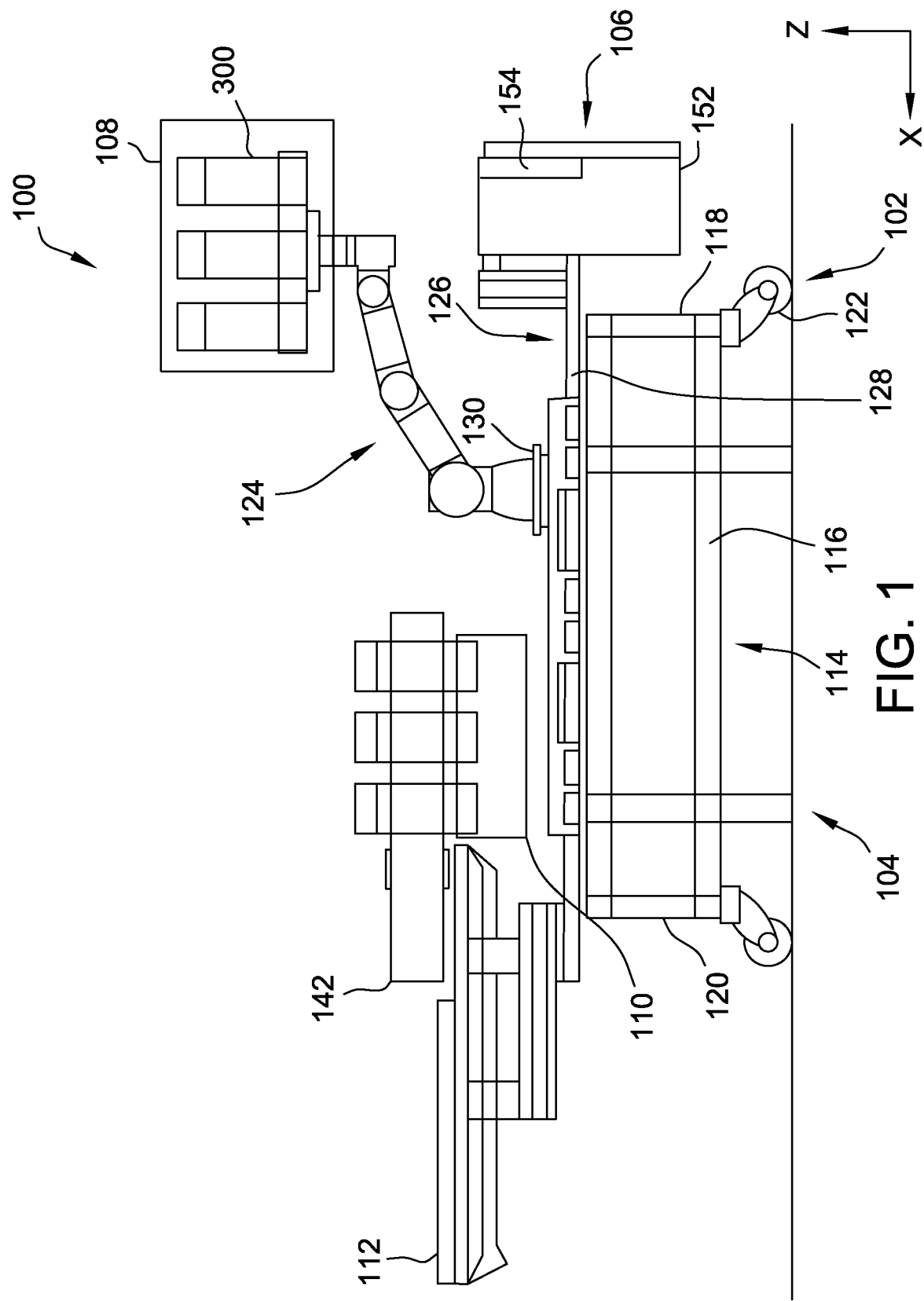
FIG. 1 is a schematic view of an exemplary system for forming a container, including an exemplary apparatus for transferring containers between stations.
Figure 2:
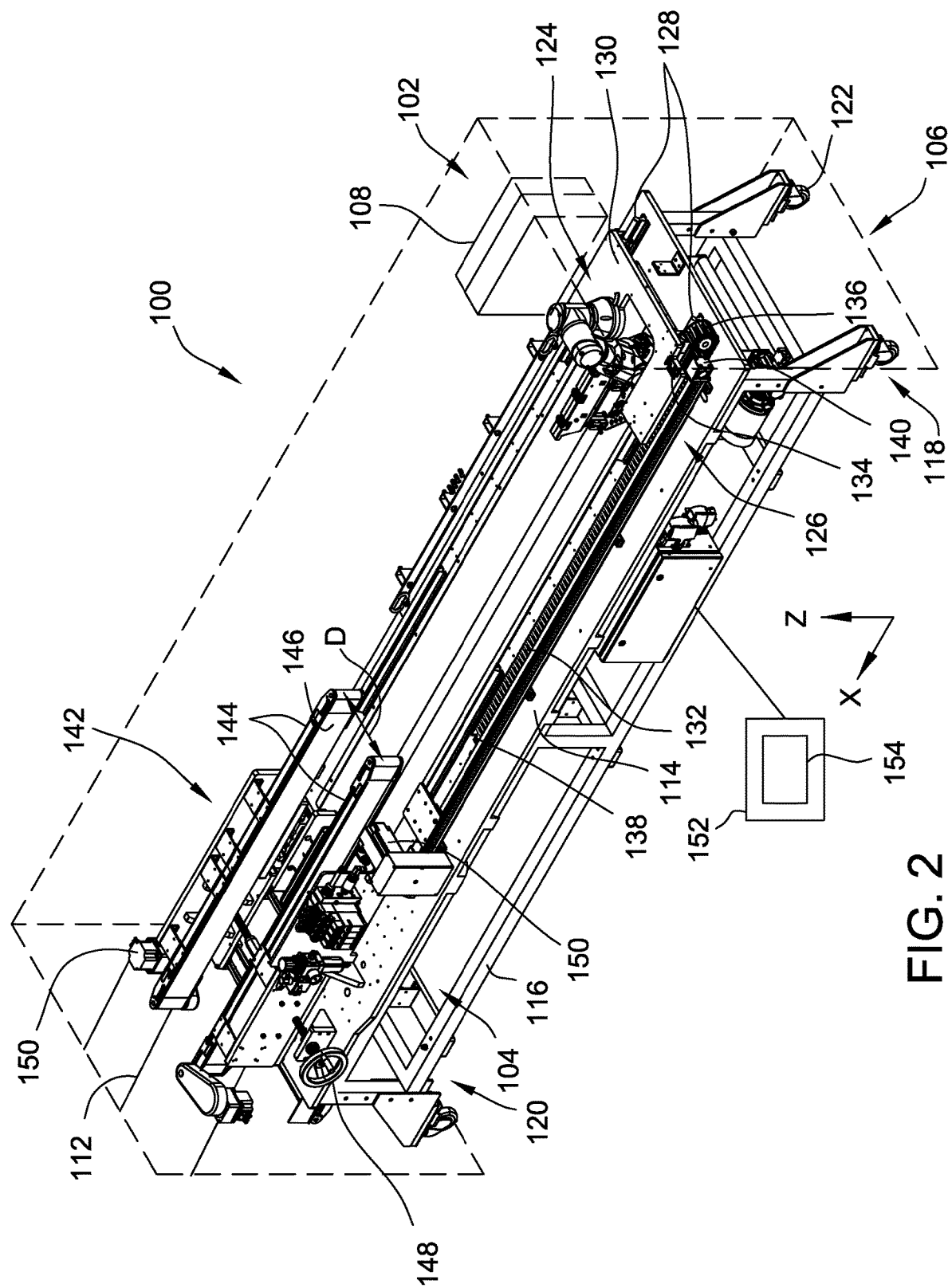
FIG. 2 is perspective view of a portion of the system shown in FIG. 1.

FIG. 1 is a schematic view of an exemplary container forming system 100, and FIG. 2 is a perspective view of the container forming system 100. The container forming system 100 is used to form one or more containers, such as containers 300 (shown in FIG. 3). In some embodiments, the container forming system 100 includes a first station 102 and a second station 104 of a first container forming line 106. In some embodiments, the first station 102 includes a molding station, at which one or more containers 300 are formed via molding. In some embodiments, the first station 102 includes, for example, a blow-molding station, an injection molding station, an extrusion molding station, a compression molding station, combinations thereof, and/or any other molding station. In some embodiments, the first station 102 is a blow-molding station. More particularly, the first station 102 is an extrusion blow-molding station including an extrusion blow mold 108. The extrusion blow mold 108 is configured to receive a parison (not shown, e.g., comprising plastic, other polymeric material, glass, etc.) and inject air into the parison to form the container 300. In some embodiments, the first station 102 includes any other suitable container-forming stations, such as a 3D printing station, a sintering station, a laminating station, a carving or cutting station, and/or any other such stations.

Figure 3:
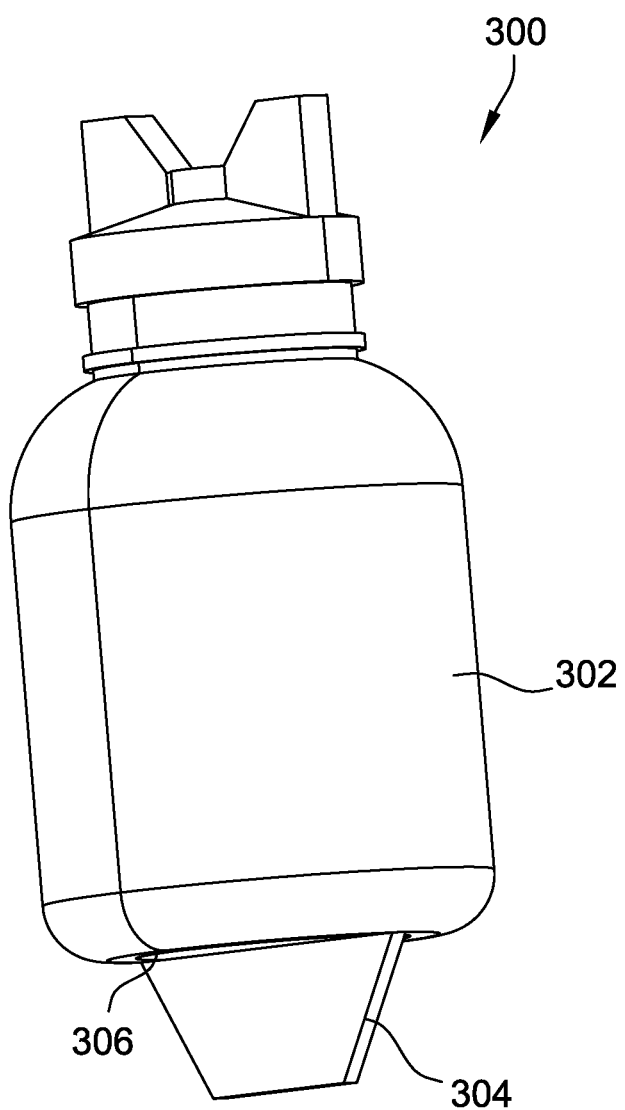
FIG. 3 is a perspective view of an exemplary container formed using the system shown in FIG. 1.

With reference to the container 300 shown in FIG. 3, the container 300 is formed at the first station 102 in, for example, a blow molding process. The container includes a body 302 and a projection 304 that comprises excess material from the blow mold process, also known as "flash" or "flashing. In the illustrated embodiment, the projection 304 extends from a bottom surface 306 of the body 302. In some embodiments, the projection 304 extends from surfaces of the body 302 other than the bottom surface 306.

In some embodiments, the second station 104 includes a deflashing station including a deflasher 110, at which one or more containers 300 are deflashed or have excess material removed therefrom. The container 300 is transferred to the second station 104 to have the projection 304 removed (deflashed). In some embodiments, the second station 104 includes, for example, a cutting, grinding, breaking, tumbling, and/or laser-deflashing station. The second station 104 is positioned downstream of the first station 102 with respect to a container transfer direction X.

The container forming line 106 further includes a transfer conveyor 112 positioned downstream of the second station 104 with respect to the container transfer direction X. The transfer conveyor 112 is configured to transport deflashed containers away from the second station 104 for further processing along the container forming line 106.

Although not illustrated, the container forming system 100 includes a plurality of container forming lines 106, each including respective first and section stations 102, 104. In some embodiments, the container forming system 100 includes additional and/or alternative stations (not shown) along one or more container forming lines 106. Moreover, although the description of components of the container forming system 100 are described herein with respect to the containers 300 as illustrated in FIG. 3, it should be readily understood that the container forming system 100 is used, in some embodiments, to form other containers having various sizes, shapes, configurations, and materials, without departing from the scope of the present disclosure.

The container forming system 100 further includes a container transfer apparatus 114 that is configured to facilitate transfer of containers 300 from the first station 102 to the second station 104. The container transfer apparatus 114 includes a wheeled frame 116 such that the container transfer apparatus 114 is transportable or maneuverable between different container forming lines 106 within the container forming system 100. As described further herein, when the container transfer apparatus 114 is positioned at a desired location relative to the container forming line 106, the wheeled frame 116 is removably coupled to the first station 102 at that location to maintain the position and alignment thereof. In some embodiments, the wheeled frame 116 extends from a first end 118 to a second end 120, and includes a plurality of wheels 122 for wheeled transport of the wheeled frame 116. Specifically, in some embodiments, the wheeled frame 116 includes a plurality of caster wheels. In some embodiments, other types of wheels or rollers are used with the wheeled frame 116.

In some embodiments, the container transfer apparatus 114 also includes a robotic arm 124 coupled to the wheeled frame 116. The robotic arm 124 is an articulated robotic arm capable of three-dimensional movement, and is further moveable or translatable with respect to the wheeled frame 116. More particularly, the wheeled frame 116 includes a linear slide 126 mounted thereto to facilitate translation of the robotic arm 124 between the first end 118 of the wheeled frame 116 and the second end 120 of the wheeled frame 116.

In the illustrated embodiment, the linear slide 126 includes a pair of parallel rails 128 coupled to the wheeled frame 116. The rails 128 extend from the first end 118 of the wheeled frame 116 to the second end 120 of the wheeled frame 116. The robotic arm 124 is mounted on a base plate 130, which is in turn slidably coupled to the rails 128. The base plate 130 is configured to translate in parallel with the container transfer direction X along the rails 128. In addition, a chain belt 132 (see FIG. 2) is coupled to the wheeled frame 116, parallel to the rails 128. A first end 134 of the chain belt 132 is looped around a geared drive shaft 136 and operatively coupled to the base plate 130, and a second end 138 of the chain belt 132 is mounted to the wheeled frame 116. In some embodiments, a driver or actuator 140 is operatively coupled to the geared drive shaft 136. The driver 140 includes a motor and any suitable electrical, mechanical, and/or electro-mechanical components suitable to drive the geared drive shaft 136 and, thereby, control the chain belt 132.

The driver 140 actuates or drives the geared drive shaft 136 to rotate in a counter-clockwise direction (with respect to the view of FIGS. 1 and 2), thereby driving the first end 134 of the chain belt 132 towards the second end 138 thereof. The movement of the chain belt 132 drives the base plate 130 along the rails 128 in the container transfer direction X, thereby translating the robotic arm 124 from the first end 118 of the wheeled frame 116 towards the second end 120 of the wheeled frame 116. In so doing, the linear slide 126 translates the robotic arm 124 from the first station 102 to the second station 104. Conversely, the driver 140 actuates or drives the geared drive shaft 136 to rotate in a clockwise direction (with respect to the view of FIGS. 1 and 2), thereby driving the first end 134 of the chain belt 132 towards the first end 118 of the wheeled frame 116. The movement of the chain belt 132 drives the base plate 130 opposite to the container transfer direction X, thereby translating the robotic arm 124 towards the first end 118 of the wheeled frame 116. In so doing, the linear slide 126 translates the robotic arm 124 from the second station 104 back to the first station 102.

The container transfer apparatus 114 further includes a pinch conveyor 142 coupled to the second end 120 of the wheeled frame 116. The pinch conveyor 142 includes two parallel conveyor belts 144 oriented with surfaces 146 of the conveyor belts 144 facing one another. The conveyor belts 144 are spaced from one another by a predetermined distance D. The distance D is adjustable (e.g., using a controller 152, described further herein, and/or an adjustment wheel 148) and is selected to correspond to a diameter of the container 300. Specifically, the distance D is selected such that, when a container 300 is transferred from the first station 102 to the pinch conveyor 142 by the robotic arm 124, the container 300 is retained by the pinch conveyor 142 upon insertion of the body 302 of the container 300 between the conveyor belts 144. The pinch conveyor 142 includes one or more drivers 150 that actuate or drive (e.g., upon receiving control signals from the controller 152) the conveyor belts 144 to translate the container 300 through the pinch conveyor 142.

In some embodiments, the pinch conveyor 142 is positioned in vertical alignment (i.e., alignment along the vertical direction Z) with the deflasher 110 of the second station 104. In some embodiments, the pinch conveyor 142 and the second station 104 substantially overlap in the container transfer direction X. In operation, the container 300 is inserted into the pinch conveyor 142, and the conveyor belts 144 are driven to position the container 300 in vertical alignment with the deflasher 110, while the container 300 is retained by the pinch conveyor 142. The deflasher 110 is raised or otherwise moved into operational engagement with the container 300 to deflash the container 300 (i.e., remove the projection 304 from the body 302). After the deflashing process is complete, the pinch conveyor 142 is driven to transfer the deflashed container 300 along the container transfer direction X to the transfer conveyor 112. The transfer conveyor 112 transfers the container 300 to a downstream location (not shown) of the container forming line 106.

In addition, the container transfer apparatus 114 includes a control system 152, also referred to as a "controller." The controller 152 is coupled in operative control communication with various components of the container forming system 100 and facilitates various electronic and/or automatic control thereof. The controller 152 includes a memory device and a processor to store and execute computer-executable instructions to control components of the container forming system 100. Specifically, the controller 152 executes computer-executable instructions to cause the robotic arm 124 to move along a predetermined path of motion, from the first station 102 to the second station 104. In addition, the controller 152 includes a user interface 154 configured to receive input from and/or provide output to a user.

Figure 4:
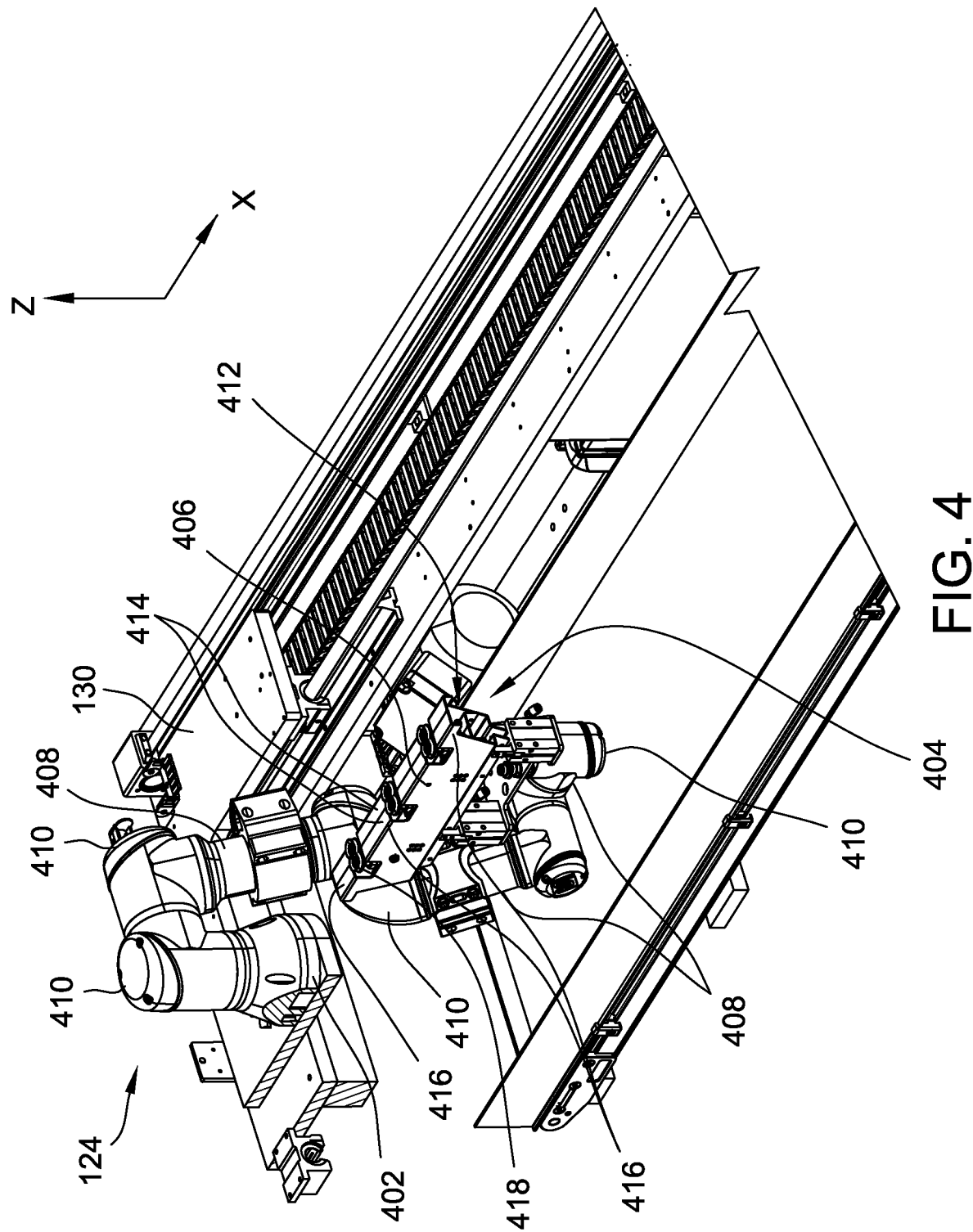
FIG. 4 is a partial cut-away view of the container transfer apparatus shown in FIG. 1 illustrating a robotic arm of the apparatus in greater detail.

With reference now to FIG. 4, a partial cut-away view of the container transfer apparatus 114 is shown. In the illustrated embodiment, the robotic arm 124 is mounted to the base plate 130 at a base end 402 of the robotic arm 124. The robotic arm 124 extends from the base end 402 to a free end 404, which includes an end effector 406 operable to grip one or more containers 300, as described herein. The robotic arm 124 includes a plurality of sections 408 rotatably coupled to one another via a plurality of joints 410. Each joint 410 enables rotation about a respective pivot axis (not labeled in FIG. 4) of the sections 408 adjacent to the joint 410. In some embodiments, the robotic arm 124 includes a suitable number of sections 408 and joints 410 to facilitate three-dimensional movements, or movement about at least six axes, such that the robotic arm 124 is free to move the free end 404 thereof in any direction and/or from any position to any other position. Although not shown, the robotic arm 124 includes a network of cables, actuators, and transceivers therein, to receive and implement control signals from the controller 152 to manipulate the sections 408 of the robotic arm 124 to position the end effector 406 as desired. Specifically, the controller 152 transmits control signals to the robotic arm 124 to move the end effector 406 along a predetermined path of motion, from the first station 102 to the second station 104.

In some embodiments, the end effector 406 includes a clamp 412 having two plates 414 operable to move towards and away from one another to grip and release one or more containers 300. The end effector 406 includes an actuator or driver (not labeled in FIG. 4) communicatively coupled to the controller 152 to receive and implement control signals therefrom that control the grip and release movements of the end effector 406. As used herein, "gripping" one or more containers 300 refers to any suitable contact that allows the end effector 406 to secure the container(s) 300 to the robotic arm 124 while the containers are transferred. Accordingly, the clamp 412 includes at least one clamping area 416 to engage at least a portion of the container 300. The plates 414 of the clamp 412 are positioned about the container 300 and are moved towards each other. The clamping area 416 engages the container 300 to releaseably clamp the container 300 with the end effector 406. In some embodiments, the end effector 406 includes a plurality of clamping areas 416 for releasably clamping a plurality of containers 300 with the end effector 406, such as three or more containers, simultaneously. In some embodiments, the end effector 406 further includes one or more suction cups 418 fixedly coupled to the clamp 412 and configured to engage the container 300. Each suction cup 418 is coupled in fluid communication with a respective independent vacuum source or generator (not shown) for selectively providing suction to selectively attach the suction cups 418 to the container 300. In alternative embodiments, at least some suction cups 418 are coupled in fluid communication with a common vacuum source or generator.

With reference to FIGS. 1-6, in operation, the blow mold 108 of the first station 102 forms one or more containers 300 in a molding process. The base plate 130 is positioned at the first end 118 of the wheeled frame 116 such that, in some embodiments, the robotic arm 124 is below the blow mold 108. Further operation of the container forming system 100 is described with respect to a single container 300, but it should be understood that in some embodiments more than one container is handled as described herein simultaneously. The controller 152 receives a signal from the first station 102 that the molding process is complete and/or automatically determines the molding process is complete (e.g., via one or more sensors, timers, etc.). The controller 152 transmits one or more control signals to control the robotic arm 124 to lift the end effector 406 into alignment with the container 300 along the vertical direction Z and to activate the end effector 406 to grip a portion of the container 300. It should be understood that in some embodiments the one or more control signals for controlling operation of the robotic arm 124 control individual joints 410, sections 408, components of the end effector 406, and/or other components of the robotic arm 124 in suitable synchronization to properly position the end effector 406 of the robotic arm 124 to engage the container 300. The clamp 412 is opened and positioned around the portion of the container 300. In some embodiments, the clamp 412 is positioned around the projection 304 of the container 300, and is closed such that the clamp plates 414 engage the projection 304. In some embodiments, the suction cups 418 are activated to releasably couple, under suction, the projection 304 to the clamp 412. In an alternative embodiment, the clamp 412 is positioned around the body 302 of the container 300 and is closed such that the clamp plates 414 (and/or the suction cups 418) couple the body 302 of the container 300 to the clamp 412.

Figure 5:
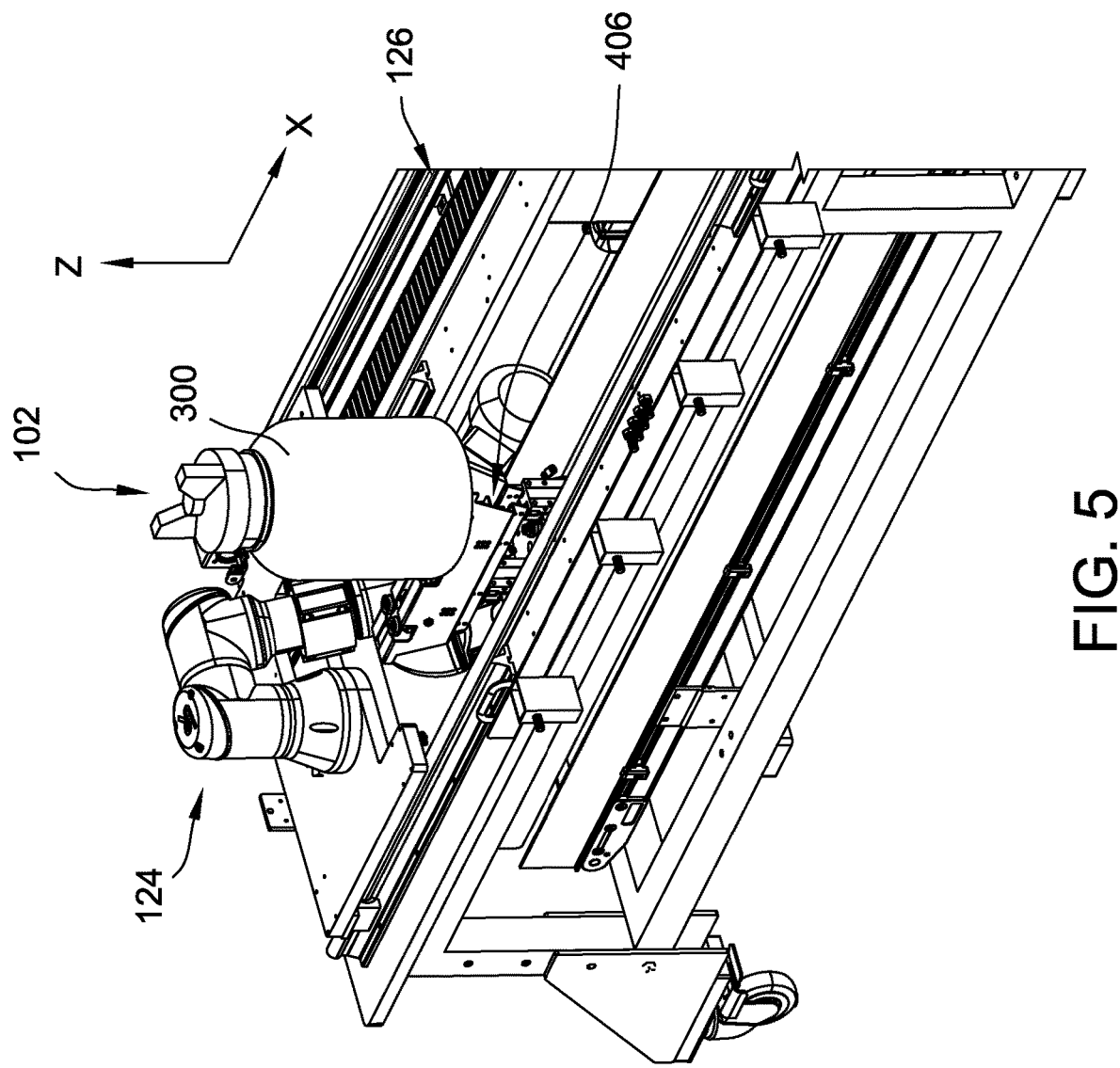
FIG. 5 is an enlarged perspective view of a portion of the container transfer apparatus shown in FIG. 4 showing the container of FIG. 3 gripped by the robotic arm at a first station.

The controller 152 transmits one or more control signals to control the robotic arm 124 to lower the container 300 out of the blow mold 108 to a level at which the container 300, when translated parallel to the container transfer direction X towards the second station 104, does not interfere with the blow mold 108 (see FIG. 5). The controller 152 transmits one or more control signals to control the linear slide 126 to translate the robotic arm 124, with the container 300 gripped thereby, along the container transfer direction X towards the second station 104. The controller 152 transmits one or more control signals to control the robotic arm 124 to vertically align the container 300 with the pinch conveyor 142, such that, as the linear slide 126 translates the robotic arm 124 in the container transfer direction X, the container 300 is inserted into the pinch conveyor 142 and engaged thereby. In some embodiments, the control signals that control the robotic arm 124 to lower the container 300 out of the blow mold 108 also control the robotic arm 124 to align the container 300 with the pinch conveyor 142.

Figure 6:
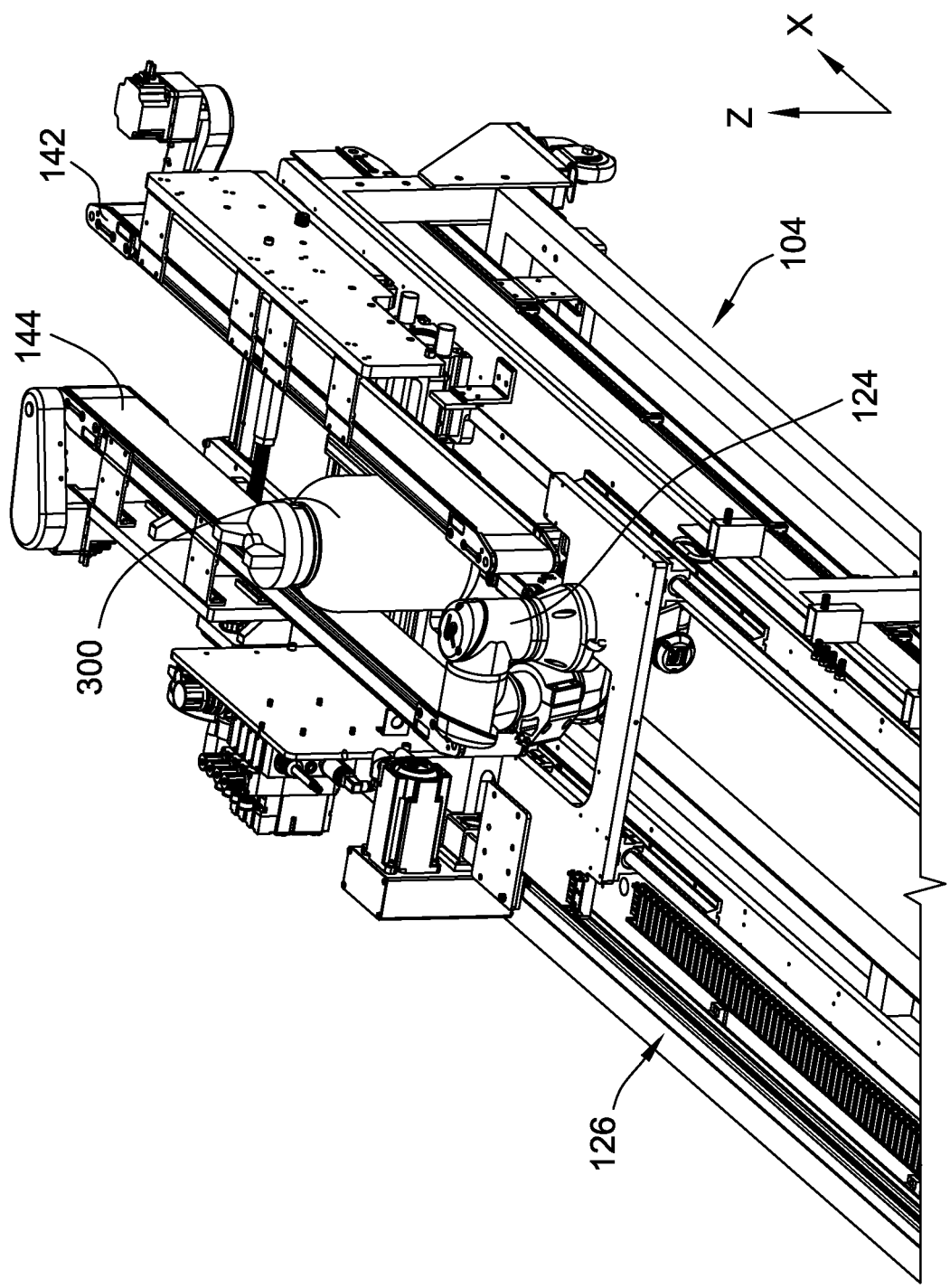
FIG. 6 is an enlarged perspective view of the container transfer apparatus showing the container of FIG. 3 gripped by the robotic arm at a second station.

The controller 152 receives a signal and/or automatically determines (e.g., via one or more sensors, timers, etc.) that the container 300 is positioned between and engaged by the conveyor belts 144 of the pinch conveyor 142 (see FIG. 6). The controller 152 transmits one or more control signals that control the robotic arm 124 to release the container 300 and, subsequently or substantially simultaneously, control the linear slide 126 to translate the robotic arm 124 opposite the container transfer direction X (i.e., towards the first end 118 of the wheeled frame 116). The controller 152 transmits one or more control signals to drive the pinch conveyor 142 to align the container 300 with the deflasher 110. Alternatively, the controller 152 transmits one or more control signals to adjust a position of the deflasher 110, to align the deflasher 110 with the container 300 along the vertical direction Z. The controller 152 subsequently transmits one or more control signals to activate the deflasher 110 to deflash the container 300. The controller 152 transmits one or more control signals to drive the pinch conveyor 142 to transfer the deflashed container 300 along the container transfer direction X to the transfer conveyor 112 and/or to any other downstream component or position in the container forming line 106. The controller 152 then transmits one or more control signals to control the robotic arm 124 to return to its initial position at the first end 118 of the wheeled frame 116.

In some embodiments, a round trip cycle by the robotic arm 124, from removing the container 300 from the first station 102 at the first end 118 of the wheeled frame 116, to transferring the container 300 to the pinch conveyor 142 at the second end 120 of the wheeled frame 116, and back to the first end 118 of the wheeled frame 116, is approximately six seconds. In alternative embodiments, the round trip transit time is greater than approximately six seconds second but less than fifteen seconds.

Figure 7:
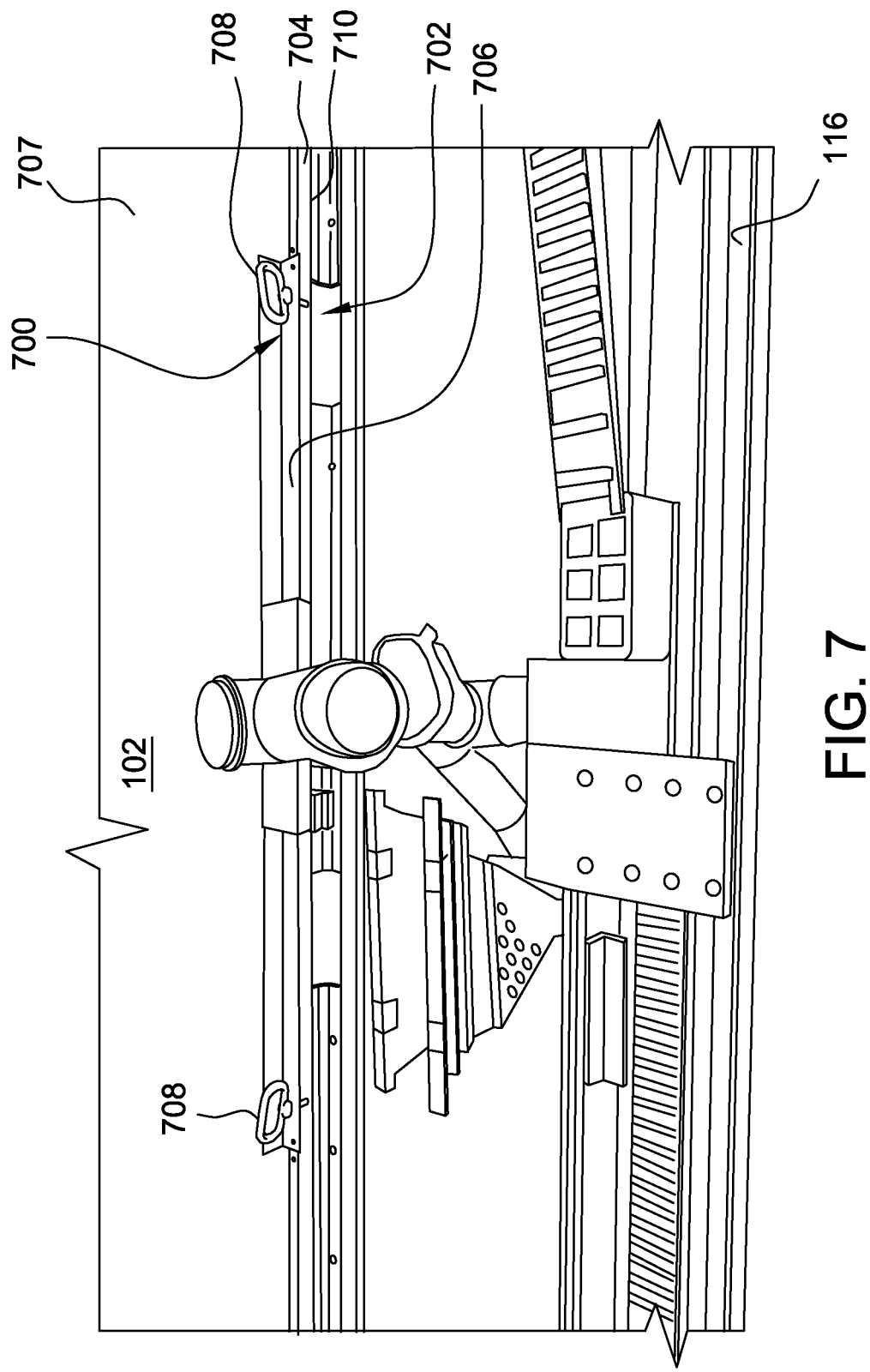
FIGS. 7 and 8 are perspective views of exemplary alignment features that are used with the system shown in FIG. 1.
Figure 8:
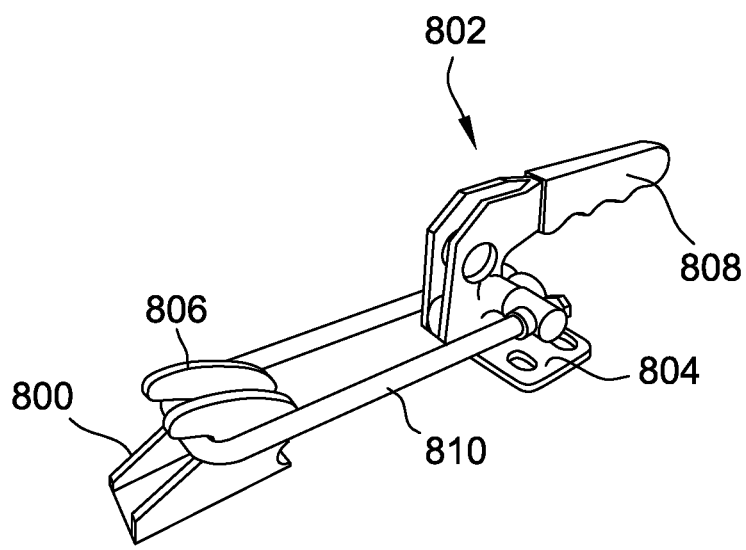

FIGS. 7 and 8 are perspective views of two exemplary alignment features 700 and 800 suitable for use with the system 100 for aligning and coupling the container transfer apparatus 114 with the first station 102. In some embodiments, the container transfer apparatus 114 includes the wheeled frame 116 such that the container transfer apparatus 114 is moveable between container forming lines 106 in the container forming system 100. In some embodiments, the container transfer apparatus 114 is positioned and aligned relative to a container forming line 106 to facilitate operation of the container transfer apparatus 114. In some embodiments, for example, the container transfer apparatus 114 includes a plurality of pre-programmed paths of motion, each path of motion corresponding to one of the container forming lines 106. To facilitate optimal operation of the container transfer apparatus 114, in some embodiments the container transfer apparatus 114 is aligned relative to the container forming line 106 prior to operation using one or more alignment features, such as alignment features 700 and 800.

In each of the embodiments illustrated in FIGS. 7 and 8, the wheeled frame 116 includes a dock 702, 802 configured to engage a respective alignment feature 700, 800 of the first station 102 to align the container transfer apparatus 114 with the first station 102. In the embodiment illustrated in FIG. 7, the dock 702 includes a pair of through-holes (not specifically shown) defined in a first side frame member 704 of the wheeled frame 116, and the alignment feature 700 includes a pair of complementary receiver holes (also not specifically shown) defined in the first station 102. Specifically, a flange 706 is coupled to a side wall 707 of the first station 102, and the receiver holes are defined in the flange 706. To align the wheeled frame 116 with the first station 102, each through-hole and a corresponding receiver hole are aligned, and a pin 708 is inserted through both holes. Accordingly, relative movement between the wheeled frame 116 and the first station 102 is inhibited. The pin 708 may include a ball detente that engages a lower surface 710 of the first side frame member 704 to retain the pin 708 in the through-hole until a suitable pulling force is applied to the pin 708, to remove the pin 708 from the through-hole and the corresponding receiver hole. In some embodiments, a similar dock (not shown) is provided on the opposite side of the wheeled frame 116 and a corresponding alignment feature (not shown) is provided on adjacent side wall of the first station 102. In such embodiments, the opposite side of the wheeled frame 116 is similarly coupled to the adjacent side wall of the first station 102 (e.g., using pins as described above), such that alignment of the wheeled frame 116 with the first station 102 is enhanced.

In the embodiment shown in FIG. 8, the dock 802 includes a tension clamp 804 coupled to the wheeled frame 116 (not shown in FIG. 8). The alignment feature 800 of the first station 102 includes a first hook or blade 806 coupled to a surface of the first station 102 (e.g., a side wall of the first station 102). The tension clamp 804 is operated using a handle 808 and includes a loop 810 that extends laterally outward from a side (e.g., a side frame member such as the first side frame member 704 shown in FIG. 7) of the wheeled frame 116. A similar tension clamp 804 may be provided on the opposite side of the wheeled frame 116 as well, such that two loops 810 extend laterally and outwardly from the wheeled frame 116 in opposite directions. Similarly, a blade 806 may be provided on a surface of the first station 102 adjacent the opposite side of the wheeled frame 116. When the handle 808 is raised, the loop 810 is not under tension and is free to pivot about a pivot axis (not specifically shown). The wheeled frame 116 is aligned with the first station 102 with the handles 808 of the tension clamps 804 raised. The loops 810 are positioned within the respective blades 806, and the handles 808 are lowered. Each loop 810 is thereby engaged with the respective blade 806 and under tension to prevent relative movement of the loop 810 with respect to the blade 806. The two loops 810 thereby provide opposing forces against the respective blades 806 to maintain alignment of the wheeled frame 116 with the first station 102.

Figure 9:
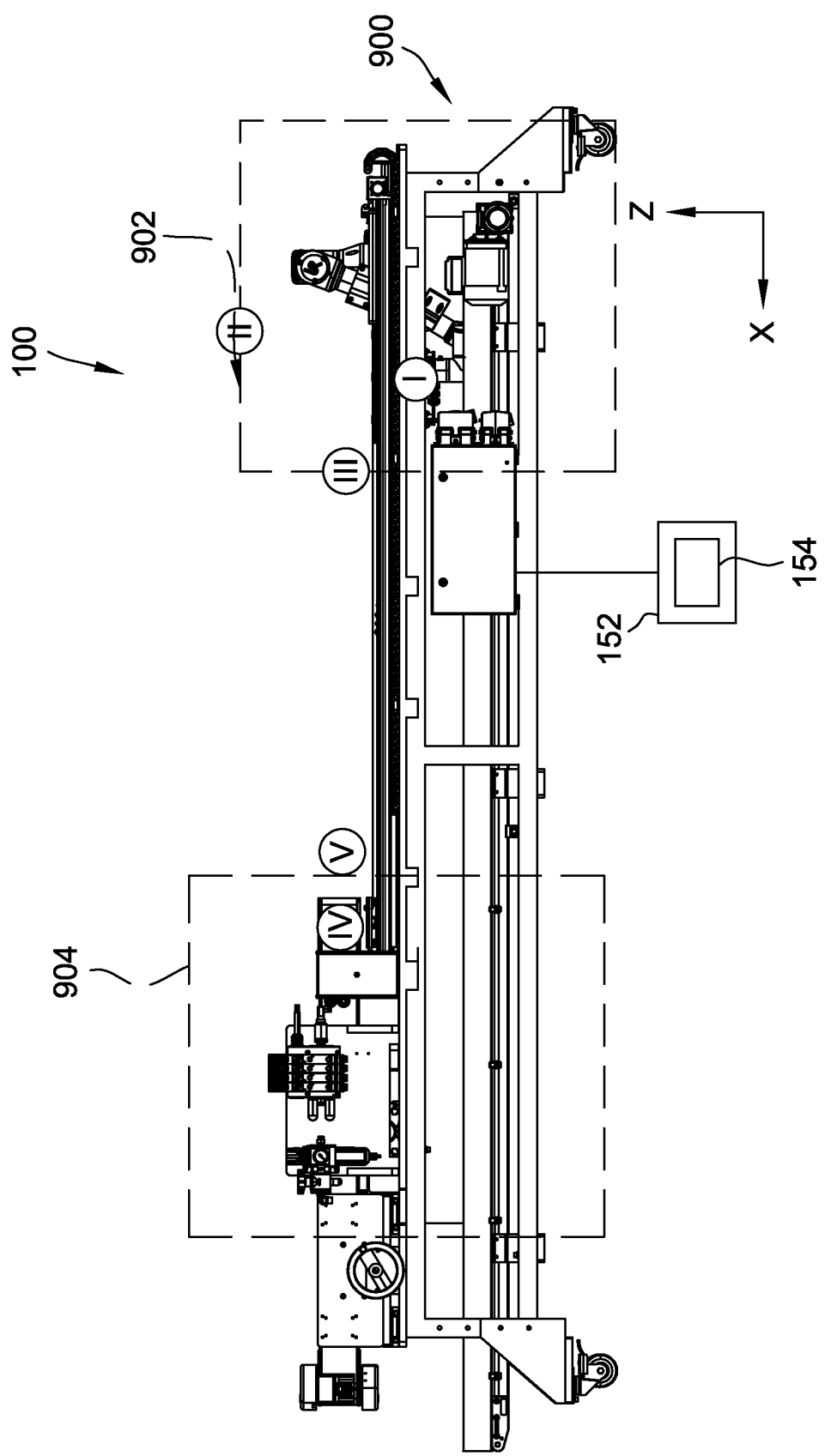
FIG. 9 is a side schematic view of the system shown in FIG. 1, illustrating an exemplary sequence of positions of the robotic arm.

When the container transfer apparatus 114 is moved to a different container forming line 106 of the container forming system 100, in some embodiments, operation of the robotic arm 124 is adjusted. For example, in some embodiments, two lines form containers of differing sizes and shapes, and/or form a different number of containers at a time. Accordingly, at any particular line, in some embodiments, control of the robotic arm 124 is customized to suit that line. FIG. 9 is a side schematic view of a line 900 of the container forming system 100 with first and second stations 902, 904 represented schematically. In some embodiments, the first and second stations 902, 904 are substantially similar to the first and second station 102, 104, respectively, shown and described above herein. However, in some embodiments, the first and second stations 902, 904 are oriented differently, or are used in forming different containers than the container 300.

In some embodiments, a user (also referred to as an "operator") uses the user interface 154 to input desired positions of the robotic arm 124 and/or the end effector 406 throughout the container transfer process, and the controller 152 is configured to determine a path of motion through which to control the robotic arm 124 to reach the desired positions. For illustrative purposes only, a sequence of positions I, II, III, IV, and V is illustrated with respect to the line 900 in FIG. 9. In some embodiments, the operator manually maneuvers the robotic arm 124 and/or the end effector 406 into each desired position of the sequence of positions using, for example, the user interface 154. For example, the operator positions the robotic arm 124 at position I (e.g., an initial position) by inputting commands into the user interface 154 to cause the controller 152 to move the robotic arm 124 to position I. The operator then uses the user interface 154 of the controller 152 to identify the current position of the robotic arm 124 to the controller 152 as the desired position I. The operator directs the controller 152 to store the current position of the robotic arm 124 as position I.

The operator then inputs commands into the user interface 154 to cause the controller 152 to control the robotic arm 124 to position the end effector 406 at position II (e.g., a container grip position). The operator then directs the controller 152 to store the current position of the robotic arm 124 and end effector 406 as position II. The operator continues to position the robotic arm 124 as desired, in positions III, IV, V, for example, using the user interface 154, and identifies each position to the controller 152 for storage thereof.

In some embodiments, reference to the position of the robotic arm 124 refers to the position of any component(s) of the robotic arm 124, including the sections 408, joints 410, and/or end effector 406 thereof, and is further related to the position of the linear slide 126. In some embodiments, not only does the controller 152 control the robotic arm 124 itself to position the robotic arm 124 as desired by the operator, but in some embodiments the controller 152 further controls the position of the base plate 130 along the rails 128. Additionally, in some embodiments, "manual" control of the robotic arm 124 by the operator refers to any method of mechanical, electrical, and/or electro-mechanical control of the robotic arm 124 that is controlled by the operator, for example, using the user interface 154, rather than under automatic control by the controller 152.

The controller 152 is configured to determine a path of motion for the robotic arm 124 (including the end effector 406) based on the sequence of positions input thereto. The controller 152 executes one or more algorithms, models, or other programming to determine the path of motion that correctly positions the robotic arm 124 as desired at each position. In some embodiments, the controller 152 accounts for the speed and/or position of any components of the line 900 in determining the path of motion. Once the path of motion is determined, the controller 152 stores the path of motion as computer-executable instructions. In operation, upon receiving a start signal, the controller 152 executes the computer-executable instructions to cause the robotic arm 124 to move the end effector 406 along the path of motion, through the sequence of positions. In some embodiments, the start signal is received automatically upon the first station 902 starting molding operations, or is inputted to the controller 152 manually by an operator.

Figure 10:
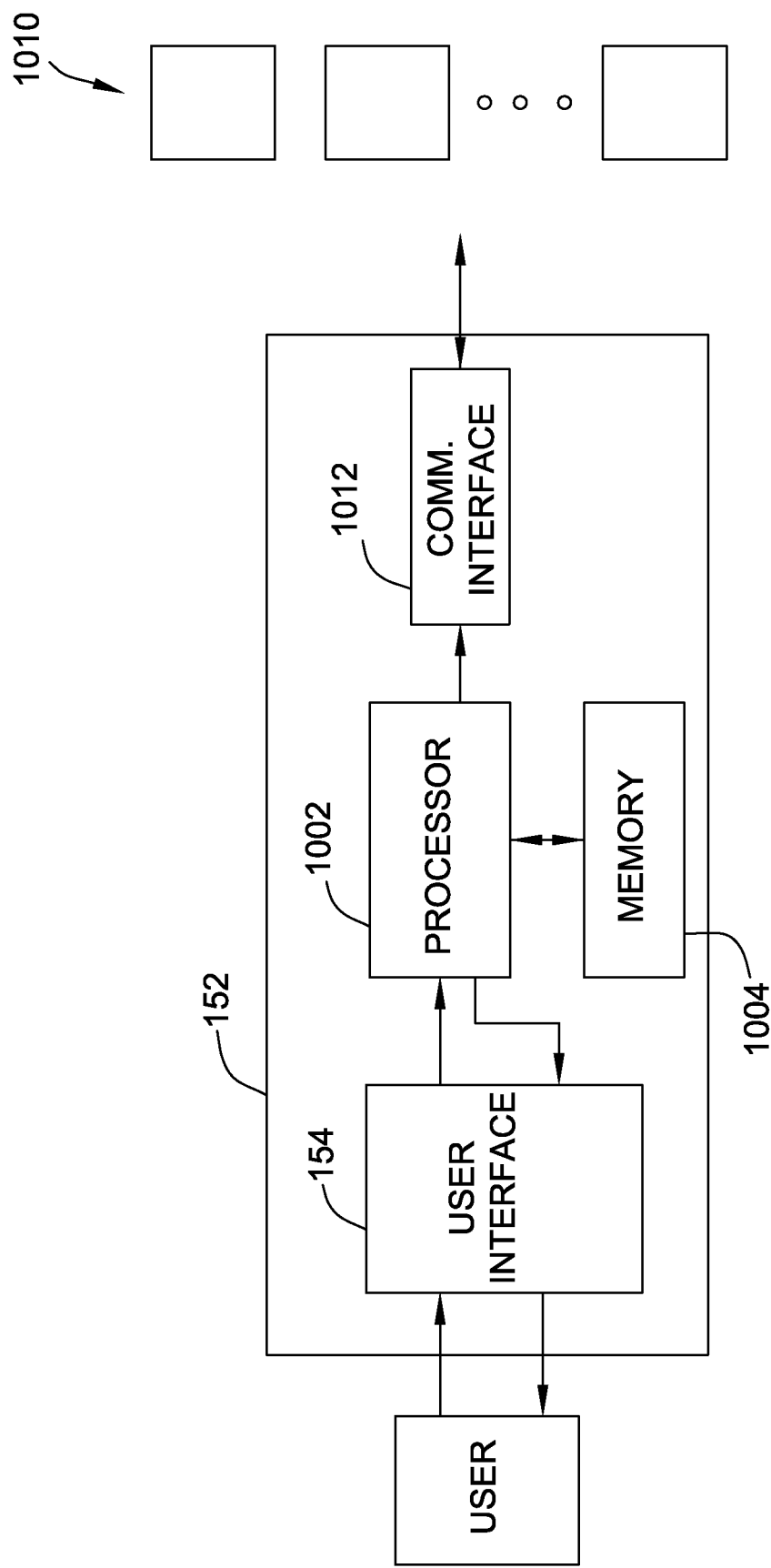
FIG. 10 is a block diagram of an exemplary controller that is used with the system shown in FIG. 1.

FIG. 10 is a schematic block diagram of the controller 152. In some embodiments, the controller 152 includes at least one processor 1002 for executing instructions. In some embodiments, executable instructions are stored in a memory area 1004. In some embodiments, processor 1002 includes one or more processing units (e.g., in a multi-core configuration). Memory area 1004 is any device allowing information such as executable instructions and/or other data to be stored and retrieved. Specifically, in some embodiments, the memory area 1004 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

The controller 152 also includes user interface 154. In some embodiments, the user interface 154 includes one or more input devices, such as for example, a keyboard, a pointing device, a mouse, a stylus, a touch sensitive panel (e.g., a touch pad or a touch screen), a camera, a position detector, and/or an audio input device. In some embodiments, the user interface 154 further includes one or more output devices, such as a display device (e.g., a liquid crystal display (LCD), organic light emitting diode (OLED) display, cathode ray tube (CRT), or "electronic ink" display) or an audio output device (e.g., a speaker or headphones). It should be readily understood that in some embodiments a single component such as a touch screen functions as both an output device and an input device of the user interface 154.

In some embodiments, the controller 152 is operatively coupled to components of the container forming system 100, referred to generally at reference numeral 1010. In some embodiments, the controller 152 is coupled to any component 1010 via a wired and/or a wireless connection. In some embodiments, the components 1010 include drivers (e.g., drivers 140 or 150), sensors, and/or any other components. In some embodiments, the controller 152 is configured to facilitate selecting a speed and/or timing of the movement and/or activation of the various components 1010. In some embodiments, the components 1010 are controlled either independently or as part of one or more linked mechanisms. The controller 152 includes a communication interface 1012, which is communicatively couplable to any component 1010 of the container forming system 100 described herein. In some embodiments, communication interface 1012 includes, for example, a wired or wireless network adapter or a wireless data transceiver for use with a local area network (LAN) or a wide area network (WAN), dial-in-connections, cable modems, special high-speed Integrated Services Digital Network (ISDN) lines, RDT networks, and/or a mobile phone network (e.g., Global System for Mobile communications (GSM), 3G, 4G or Bluetooth) or other mobile data network (e.g., Worldwide Interoperability for Microwave Access (WIMAX)).

Figure 11:
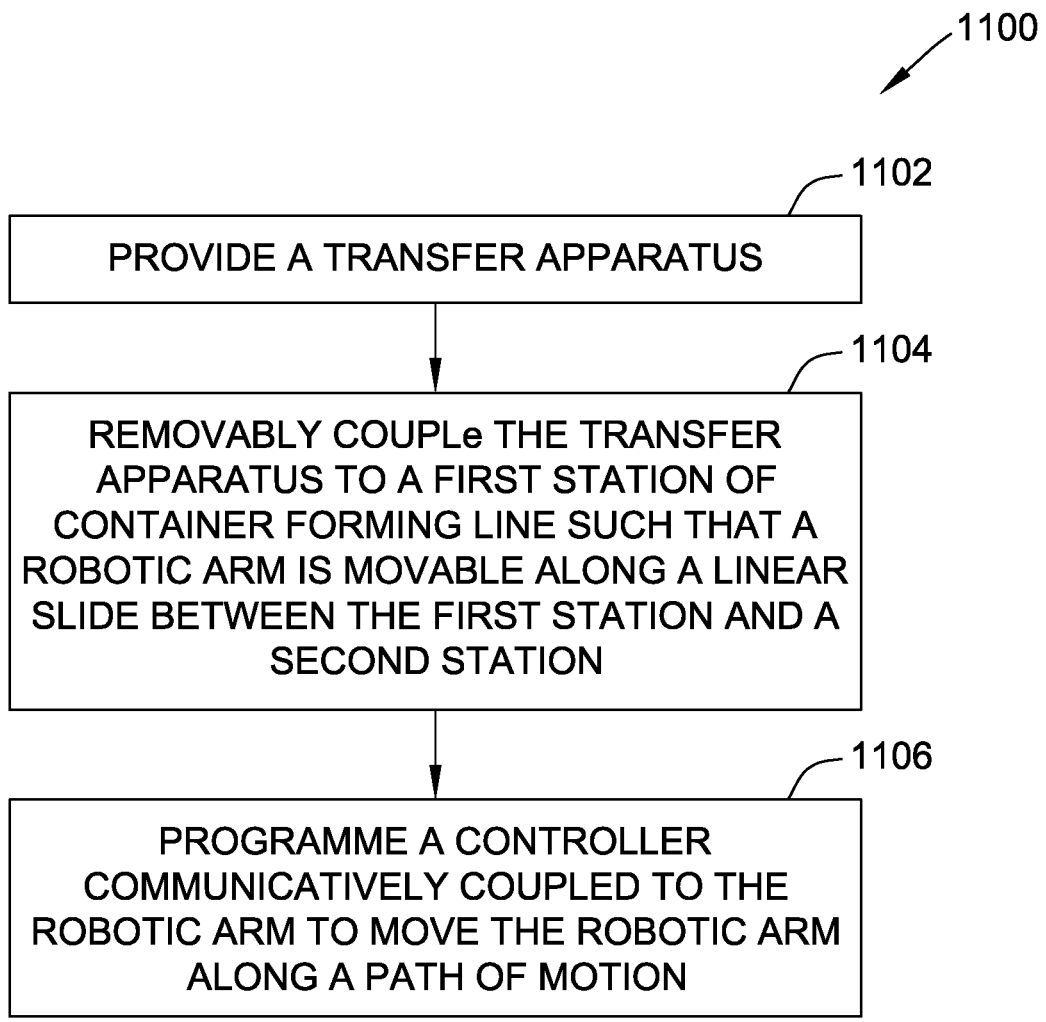
FIG. 11 is a flow chart of an exemplary method of assembling a container forming line.

FIG. 11 is a flow diagram illustrating a method 1100 of assembling a container forming line (e.g., the container forming line 106, shown in FIGS. 1 and 2). The container forming line includes a first station (e.g., the first station 102, shown in FIG. 1) and a second station (e.g., the second station 104, also shown in FIG. 1).

The method includes providing 1102 a transfer apparatus (e.g., the container forming apparatus 114) including a linear slide (e.g., the linear slide 126) mounted to a wheeled frame (e.g., the wheeled frame 116), and an articulated robotic arm (e.g., the robotic arm 124, all shown in FIG. 1) mounted to the linear slide and movable along the linear slide. The robotic arm includes an end effector (e.g., the end effector 406, shown in FIG. 4) operable to grip a container (e.g., the container 300, shown in FIG. 3) to remove the container from the first station.

The method also includes removably coupling 1104 the wheeled frame to the first station such that the robotic arm is movable along the linear slide between the first station and the second station, and programming 1106 a controller (e.g., the controller 152, shown in FIG. 1) communicatively coupled to the robotic arm to move the end effector along a path of motion. Programming 1106 the controller includes inputting, using a user interface (e.g., the user interface, also shown in FIG. 1), a sequence of positions for the end effector. The controller determines the path of motion based on the user-input sequence of positions, and generates computer-executable instructions which, when executed by the controller, cause the robotic arm to move the end effector along the determined path of motion.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to illustrate the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for transferring a container from a first station to a second station of a container forming line, the apparatus comprising:
    a frame;
    a slide mounted to the frame; and
    a robotic arm mounted to the slide and movable along the slide between the first station and the second station, the robotic arm comprising an end effector operable to remove the container from the first station;
    wherein the frame is removably coupleable to at least one of the first station and the second station such that the apparatus is transportable to a different container forming line.

2. The apparatus of claim 1, further comprising a controller communicatively coupled to the robotic arm, the controller executing computer-executable instructions to cause the robotic arm to move the end effector along a predetermined path of motion.

3. The apparatus of claim 2, further comprising a user interface communicatively coupled to the controller, the user interface configured to receive user input identifying a sequence of positions for the end effector, wherein the controller is further configured to:
    determine a second path of motion for the end effector based on the user-input sequence of positions; and
    generate computer-executable instructions which, when executed by the controller, cause the robotic arm to move the end effector along the determined second path of motion.

4. The apparatus of claim 2, wherein the controller is configured to execute the computer-executable instructions to cause the robotic arm to move the end effector in the predetermined path of motion in response to receiving a start signal from the first station.

5. The apparatus of claim 1, wherein the frame comprises a dock configured to engage an alignment feature of the at least one of the first station and the second station to align the apparatus with the first station.

6. The apparatus of claim 1, further comprising a driver operably coupled to the robotic arm and configured to move the robotic arm along the slide between the first station and the second station.

7. The apparatus of claim 1, wherein the end effector comprises at least one clamp.

8. The apparatus of claim 7, wherein the at least one clamp comprises a plurality of clamping areas for releasably clamping a plurality of containers with the end effector.

9. The apparatus of claim 7, wherein the end effector further comprises at least one suction cup coupled in fluid communication with a vacuum source and positioned to releasably couple the container to the end effector.

10. The apparatus of claim 1, wherein the first station is a molding station, and the second station is a deflashing station.

11. A system for forming a container, the system comprising:
    a first station;
    a second station; and
    a transfer apparatus for transferring the container from the first station to the second station, the transfer apparatus comprising:
        a frame removably coupled to at least one of the first station and the second station;
        a slide mounted to the frame; and
        a robotic arm mounted to the slide and movable along the slide between the first station and the second station, the robotic arm comprising an end effector operable to remove the container from the first station.

12. The system of claim 11, wherein the at least one of the first station and the second station comprises an alignment feature, and wherein the frame comprises a dock configured to engage the alignment feature to align the transfer apparatus with the at least one of the first station and the second station.

13. The system of claim 11, wherein the first station is a molding station comprising a blow mold, and the second station is a deflashing station configured to remove flashing from the container.

14. The system of claim 13, further comprising a transfer conveyor positioned downstream from the deflashing station, the transfer conveyor configured to transport deflashed containers away from the deflashing station.

15. The system of claim 13, wherein the blow mold is an extrusion blow mold configured to receive a parison and inject air into the parison to form the container.

16. The system of claim 11, wherein the transfer apparatus further comprises a controller communicatively coupled to the robotic arm, the controller executing computer-executable instructions to cause the robotic arm to move the end effector along a predetermined path of motion.

17. The system of claim 16, wherein the transfer apparatus further comprises a user interface communicatively coupled to the controller, the user interface configured to receive user input identifying a sequence of positions for the end effector, wherein the controller is further configured to:
   determine a second path of motion for the end effector based on the user-input sequence of positions; and
   generate computer-executable instructions which, when executed by the controller, cause the robotic arm to move the end effector along the determined second path of motion.

18. The system of claim 16, wherein the controller is configured to execute the computer-executable instructions to cause the robotic arm to move the end effector along the predetermined path of motion in response to receiving a start signal from the first station.

19. The system of claim 11, wherein the transfer apparatus further comprises a driver operably coupled to the robotic arm and configured to move the robotic arm along the slide between the first station and the second station.

20. A method of assembling a container forming line including a first station and a second station, the method comprising:
   providing a transfer apparatus including:
      a slide mounted to a frame; and
      a robotic arm mounted to the slide and movable along the slide, the robotic arm including an end effector operable to remove the container from the first station;
   removably coupling the frame to at least one of the first station and the second station such that the robotic arm is movable along the slide between the first station and the second station; and
   programming a controller communicatively coupled to the robotic arm to move the end effector along a path of motion, wherein programming the controller comprises inputting, using a user interface, a sequence of positions for the end effector, wherein the controller determines the path of motion based on the user-input sequence of positions and generates computer-executable instructions which, when executed by the controller, cause the robotic arm to move the end effector along the determined path of motion.

* * * * *